(12) United States Patent
Chan et al.

(10) Patent No.: US 6,384,116 B1
(45) Date of Patent: May 7, 2002

(54) BINDER COMPOSITION AND PROCESS

(75) Inventors: Lock-Lim Chan, Toronto (CA); Peter DeBaun Wallace, Morganton, NC (US)

(73) Assignee: Borden Chemical, Inc., Columbus, OH (US)

( * ) Notice: Subject to any disclaimer, the term of this patent is extended or adjusted under 35 U.S.C. 154(b) by 34 days.

(21) Appl. No.: 09/659,726

(22) Filed: Sep. 11, 2000

Related U.S. Application Data

(60) Provisional application No. 60/177,977, filed on Jan. 25, 2000.

(51) Int. Cl.$^7$ ................................................. C08K 5/16
(52) U.S. Cl. ........................................................ 524/186
(58) Field of Search .......................................... 524/186

(56) References Cited

U.S. PATENT DOCUMENTS

| | | | | |
|---|---|---|---|---|
| 4,069,183 A | * | 1/1978 | Daimer ...................... | 260/29.3 |
| 4,178,203 A | | 12/1979 | Chakrabarti ................ | 162/156 |
| 4,183,782 A | | 1/1980 | Bondoc ...................... | 162/156 |
| 4,403,013 A | * | 9/1983 | Robitschek ............... | 428/318.4 |
| 4,500,629 A | * | 2/1985 | Irving ........................ | 430/325 |
| 5,212,008 A | * | 5/1993 | Malhotra .................... | 428/216 |
| 5,804,254 A | | 9/1998 | Nedwick et al. ......... | 427/389.8 |
| 5,914,365 A | | 6/1999 | Chang et al. ............... | 524/512 |
| 5,965,638 A | | 10/1999 | Heine .......................... | 524/13 |
| 6,084,021 A | * | 7/2000 | Chang ......................... | 524/512 |

OTHER PUBLICATIONS

Tech. Pub. on Solution HS—100 by Rohm & Haas Company.
MSDS of Apr. 16, 1996, pp. 1 and 4 only, for Solution HS—100 OF Rohm & Haas Company.
Tech. Pub. of Feb., 1995 on EXP 3360 by Rohm & Haas Company.
MSDS of May 7, 1997, p. 1 only, for W—161—59A of Franklin International.
Tech. Pub. on RHOPLEX GL–618 by Rohm & Haas Company.
Tech. Pub. of 1991 on E–2321 by Rohm & Haas Company.
MSDS of Sep. 10, 1991, pp. 1 and 6 only for ROPAQUE OP—62 LO EMULSION of Rohm & Haas Company.
MSDS of Oct. 23, 1993, pp. 1, 6, and 7 only for ROPAQUE HP—91 EMULSION of Rohm & Hass Co.
Tech. Pub. of Feb., 1995 for EXP—3309 by Rohm & Hass Company.

* cited by examiner

*Primary Examiner*—Paul R. Michl
(74) *Attorney, Agent, or Firm*—Kenneth P. Van Wyck; George P. Maskas

(57) ABSTRACT

The specification discloses a binder composition comprising a urea formaldehyde resin modified with a water soluble non-ionic amine oxide and optionally further modified with an anionic acrylic latex and/or a water soluble polymer comprising 40–100% by weight, based on polymer weight, of a polymerized ethylenically unsaturated carboxylic acid monomer, the polymer having a weight average molecular weight from 100,000 to 2,000,000. Glass fiber mats bonded with the binder composition as well as roofing products, e.g., shingles, prepared from the glass mats bonded with the binder composition of this invention are also disclosed. The binder composition containing the amine oxide provides superior tear strength to glass fiber mats and with the use of the latex and/or water soluble polymer an improved tensile strength of the mats, as well as to asphalt roofing and other products made therefrom while maintaining the high tear strength. The specification also discloses processes for making: the binder; the bonded glass fiber mats; and the roofing products. The disclosure also provides a process for choosing a glass fiber mat or a specific formulation of the binder for use with each other which provides a desirable tensile and tear strength to the mat.

26 Claims, No Drawings

BINDER COMPOSITION AND PROCESS

This application is entitled to priority under 35 U.S.C. 119 (e) due to provisional application Ser. No. 60/177,977 which was filed on Jan. 25, 2000.

This invention relates to a urea formaldehyde (UF) resin modified with a water soluble non-ionic amine oxide. The modified resin has utility for increasing the tear strength of products prepared from glass fiber mats treated with the modified UF resin. This invention also relates to the further modification of the UF resin containing the amine oxide wherein such further modification includes the addition thereto of an anionic acrylic latex and/or a water soluble polymer of a polymerized ethylenically unsaturated carboxylic acid monomer whereby the tear property of the treated mat is significantly increased while maintaining the high level of tensile strength. The water soluble polymer comprises 40% to 100% by weight, based on polymer weight, of a polymerized ethylenically unsaturated carboxylic acid monomer wherein the polymer has a weight average molecular weight of from 100,000 to 2,000,000 and is also referred to herein simply as the water soluble polymer. The invention further relates to glass fiber mats impregnated with the modified UF resins, as well as roofing products and backing sheets for vinyl flooring utilizing the modified urea formaldehyde impregnated glass fiber mats. This invention also relates to a process for choosing the most desirable combination of binder and mat for manufacture of binder treated glass fiber mats.

BACKGROUND AND PRIOR ART

Asphalt coated glass fiber mats are increasingly used as roofing shingles, replacing similar sheets traditionally made of wood or cellulose fibers. This type of glass fiber based roofing product has advantages such as in strength properties and in fire retardant characteristics.

Glass fiber mats are usually made by a wet-laid non-woven process somewhat similar to the paper making process. Examples of such processes can be found in U.S. Pat. Nos. 2,906,660; 3,766,003 and 3,838,995, each of which is incorporated herein by reference in its entirety. The wet-laid non-woven process for glass fiber mats can be described in the following stages:

The first stage involves forming an aqueous suspension of short length fibers under agitation in a mixing tank which is sometimes called the "pulper". Glass fibers used in this application are generally about 0.5 to about 2 inches in length with typical diameters of about 3 to 20 microns. The glass fibers are also "sized". Sizing is a process in which glass fiber manufacturing companies use proprietary chemistry and processes to provide various functions to the surface of the fiber. The functions are:

(A) As lubricants-coolants in the glass forming process while passing through the chopper to keep it dense;

(B) As moisture binding agents; and (C) As aids to dispersion in the pulper.

The sizing process and sizing agents are also used to affect the physical properties of the glass fiber mats.

The short glass fibers come as strands or bundles and do not disperse well when mixed with water. In fact, upon prolonged agitation, the glass fibers agglomerate as large clumps which are difficult to re-disperse. Dispersion aids, usually surface active products, are used to facilitate the dispersion. High molecular weight polymers such as polacrylamide and hydroxyethyl cellulose are used to increase the viscosity of the media (water) in the pulper to help the suspension of the glass fibers. The dispersion of these glass fibers is critical for the formation of the mat.

The second stage of the process involves the formation of a glass fiber mat. The glass fiber dispersion in the "pulper" is further diluted with water, and passed through a mat forming machine. The fibers are collected on a moving wire screen in the form of a non-woven mat. Water is removed by gravity and, more often, by vacuum devices in the forming machine. The forming machine often moves at a speed of several hundred feet per minute. At the end of the second stage, the mat of glass fibers maintains its physical integrity and although it still contains water, there is little or no drippage of water from the mat.

During the process of mat forming, the wet mats need to be transferred from one section of the machine to another. Therefore, it is important that the mat has enough wet web strength to maintain its integrity during the non-woven wet laid process.

The third stage of this process involves binder application. Binders are applied to the moving mat by, for example, a falling film or curtain coater. After the binder application, the treated mats go through a de-watering device, which removes excess water to ensure a thorough application of binder throughout the glass fiber mat.

The fourth stage of the process involves the drying and curing of the glass fiber mats treated with binder. The treated mats are then passed through a series of ovens or other heating devices, usually at a temperature range of 200 to 250° C. The binder treated mats are dried and the binder is cured when the mat passes through the ovens. The degree of curing or cross-linking of the thermosetting urea formaldehyde resin, along with its modifiers such as amine oxide, latex and/or water soluble polymers, affects the strength properties of the glass fiber mat. The interaction between the glass fiber surface and the binders during curing affects the distribution of the binder network and the glass fibers and therefore is important in determining the physical properties of the finished mats.

After the glass fiber mat has been formed and cured, it can be passed through a process which involves coating the mat with hot asphalt to form a roofing product such as roofing shingles. While the strength of the roofing product depends primarily on the strength of the mat, the tear property sometimes does not transfer fully to the roofing product.

Roofing products need to meet governmental and industrial strength requirements. The industry has successfully met the requirements in the past and has been able to optimize the tensile and tear properties. Recently, however, the need to withstand severe weather conditions caused a demand for further improvement in the tear property of the roofing shingles.

It is generally accepted that there is a balance between the tensile strength and the tear strength of the glass fiber mats. Processes in the prior art have provided an optimum balance between the tensile and tear properties which meet the earlier requirements. It is generally understood that the technical parameters in which the industry can work to obtain an increase in mat tensile also tends to lower tear strength. Therefore, it has been difficult to meet tear strength requirements without sacrificing the tensile strength. A simple solution to this problem is to increase the basis weight of the mat. However, this is a costly approach, and also provides an undesirable increase in the load of the shingles which the roof has to support.

Glass fiber producers have also tried to provide a solution by changing the sizing compositions and sizing technology. Recently these producers have developed fibers which provide high tear values or high tensile values to the glass fiber. These changes have not met the optimum requirement of the industry because of the following observations and reasons:

(1) The fiber either provides very high tensile strength and significant loss in tear strength or provides very high tear and substantial loss in tensile strength.

(2) The sizing chemistry has a significant effect on the distribution of the binder and fiber during curing. The effects of sizing changes can be so substantial that it makes it difficult to balance the desirable properties by sizing alone.

(3) A small amount of sizing material will dissolve into the white water during mixing and storage. This amount may be small, but when one looks at the very small amount of surfactant or dispersing agent used in the system, the amount of sizing material dissolved in the white water will significantly affect the white water chemistry and the dispersing of the fibers in the pulper.

Points (2) and (3) above are probably the reasons which make it difficult to optimize the tear and tensile strength by using only the sizing chemistry of the glass fibers.

U.S. Pat. No. 4,178,203 to P. Chakrabarti which issued on Dec. 11, 1979 discloses the use of amine oxide for increasing the dispersability of aqueous slurry of glass fibers in making glass fiber mats. After the mat is prepared, certain anionic surfactants are applied to the wet mat and eventually a binder is applied to the mat.

U.S. Pat. No. 4,183,782 to A. Bondoc which issued on Jan. 15, 1980 discloses the use of amine oxide and a derivatized guar gum to increase the dispersibilty of glass fibers in an aqueous slurry in the process of making a glass fiber mat. Eventually, a binder such as UF resin is applied to the mat.

U.S. Pat. No. 5,804,254 to P. Nedwick, et al. which issued on Sep. 8, 1998 discloses a method for flexibilizing a glass fiber non-woven bound with a cured urea formaldehyde resin binder wherein the binder includes a cured urea formaldehyde resin and 0.5% to 5% by weight, based on the weight of the urea formaldehyde resin of a water soluble polymer comprising 40% to 100% by weight, based on polymer weight, of a polymerized ethylenically unsaturated carboxylic acid monomer, the polymer having a weight average molecular weight from 100,000 to 2,000,000.

U.S. Pat. No. 5,914,365 to S. Chang et al. which issued on Jun. 22, 1999 discloses a binder composition containing UF resin modified with water soluble styrene-maleic anhydride copolymer for binding glass fiber mats. It also uses an aqueous slurry of amine oxide to disperse glass fibers. An example shows the use of UF resin modified with acrylic resin in comparison with the use of UF resin modified with styrene-maleic anhydride copolymer.

U.S. Pat. No. 5,965,638 to D. Heine which issued on Oct. 12, 1999 discloses a structural mat matrix, e.g., roofing shingle mat matrix, which consists essentially of: fiberglass fibers (80% to 90%); 20% to 1% of wood pulp; and a binder which consists essentially of UF resin; and from 20% to 5% of acrylic copolymer.

Although some of the above references show the use of amine oxide as a dispersant for the formation of the aqueous glass fiber slurry, the glass fiber mat at the time of application of the modified urea formaldehyde binder is substantially free of amine oxide, i.e., less than the amount needed to attain the advantageous tear properties shown by this invention. This is due to the solubility and high dilution of the amine oxide in the initial aqueous slurry, the usual addition of more water to the initial slurry and the drainage of water from the mat as it is being formed.

One object of this invention is to provide a process by which the binder described in this invention may be used with different types of glass fibers to provide an optimization of tensile and tear strength to non-woven glass fiber mats.

Another object of the invention is to provide a binder system which imparts the required improvement in tear strength to the glass fiber mat while maintaining an acceptable level of tensile strength.

Yet another object of the invention is the provision of increased tear strength and acceptable tensile properties to the coated asphalt roofing products. There have been cases wherein improvements in glass fiber mat strength do not represent an improvement in the roofing products due to the interaction of the binder treated mat with the asphalt coating process.

SUMMARY OF THE INVENTION

It has now been found that a binder composition comprising a urea formaldehyde(UF) resin modified with a water soluble non-ionic amine oxide provides improved tear properties to glass fiber mats. Also, the tensile strength of glass fiber mats treated with the modified UF resin can be improved with essentially no adverse effect on the improved tear property brought about by the modified UF binder by further modifying the UF resin with a latex and/or a water soluble polymer. Additionally, products, e.g., asphalt impregnated roofing products made from the bonded glass fiber mats maintain the desirable tensile and tear properties of the glass fiber mats. In addition to processes for producing the modified binder, bonded glass fiber mats and asphalt impregnated roofing products, this invention provides a process for choosing a combination of: (a) a modified UF binder for use with various glass fiber mats; or (b) various formulations within the bounds of the modified urea formaldehyde resin for use with glass fiber mats which provide substantially the same tear and tensile properties when substantially the same formulations are used. Such choosing or selecting is for the purpose of finding the combination of mat and binder or combination of formulation and mat for obtaining desirable tear and/or tensile properties in the bonded mats.

In one aspect, this invention is directed to a binder composition comprising a UF resin modified with a water soluble non-ionic amine oxide.

In another aspect, this invention is directed to a binder composition comprising a UF resin which has been modified with a water soluble non-ionic amine oxide and further modified with a latex and/or a water soluble polymer.

In still another aspect, this invention is directed to glass fiber mats which have been bonded with a binder composition comprising a UF resin which has been modified with a water soluble non-ionic amine oxide and optionally wherein such binder is further modified with a latex, a water soluble polymer, or both a latex and a water soluble polymer.

In yet another aspect, this invention is directed to a roofing product of an asphalt impregnated glass fiber mat bonded with a binder composition of a UF resin modified with amine oxide which may be further modified with latex and/or a water soluble polymer.

In a specific aspect of this invention, a glass fiber mat is made by the method comprising: dispersing glass fibers in an aqueous slurry; passing the slurry through a mat forming screen to form a wet glass fiber mat; applying a binder comprising a urea formaldehyde resin modified with a water soluble non-ionic amine oxide and optionally an acrylic latex and/or a water soluble polyacrylate; and curing the binder applied to the wet fiber mat.

In yet a further aspect, this invention is directed to processes for the manufacture of the above binders, glass fiber mats bonded with the above binders and asphalt impregnated glass fiber mats bonded with the above binders.

In but a still further aspect, this invention is directed to a process for obtaining desired or improved tear and at least equal or improved tensile properties in a glass fiber mat by choosing glass fiber mats for manufacture into mats bonded with a UF binder composition of this invention from glass fiber mats which may have differing chemical and physical properties and consequently provide different values of tensile and tear strength to a mat bonded with said binder composition. The process comprises:

(A) testing various glass fiber mats bonded with the UF binder to determine their tensile and tear properties;

(B) choosing glass fiber mats, or glass fibers for manufacture into mats, which provide the desirable tear and tensile strength for binding into mats with said binder; and, optionally (C) using glass fiber mats having substantially the same chemical and physical properties as the mats which provide the desirable tear and tensile strength for production of additional mats bonded with said binder.

In but yet a still further aspect, this invention is directed to a process for choosing a formulation of a urea formaldehyde binder composition of this invention from differing formulations of said urea formaldehyde binder for binding glass fiber mats wherein the various formulations of said binder provide different values of tensile and/or tear strength to said glass fiber mat bonded with said binder in order to obtain a desirable combination of tear and tensile strength in the glass fiber mat, said binder formulations being that of a urea formaldehyde resin modified with a water soluble non-ionic amine oxide and a member selected from the group consisting of a latex, a water soluble polymer and both a latex and a water soluble polymer wherein the quantity of the amine oxide and the presence of one of said members and/or the amounts of such members in the formulation differ, said process comprising the steps of:

(A) testing various formulations of said binder differing in the amount of amine oxide, the presence or absence of either the latex or water soluble polymer and the amounts of said latex or polymer in the formulation wherein said tests are conducted on glass fiber mats which provide substantially the same tear and tensile properties when substantially the same formulation is used in order to determine the tear and tensile strength of the glass fiber mats after application of the various formulations;

(B) choosing the formulation which provides the desirable tear and/or tensile strength for binding the said fiber mats; and optionally (C) using the formulation which was chosen in (B) above for the further production of said glass fiber mats bonded with the chosen formulation.

DETAILED DESCRIPTION OF THE INVENTION

The Urea Formaldehyde (UF) Resin

Methods for preparation of the thermosetting UF resin which may be used in this invention are known to those skilled in the art. Commercially available UF resins sold to the glass fiber mat industry by Borden Chemical, Inc, and Georgia Pacific Resins Corp., for example, are suitable for use in this invention.

UF resins are generally optimized during their manufacture by adding polyalkylenepolyamines such as triethylene tetramine, tetraethylenepentamine as well as ammonium hydroxide to provide charge characteristics as well as to moderate the subsequent curing rate of the resin. The amount of polyalkylenepolyamines used in the manufacture of the UF resin will generally vary from about 0 to 3% and preferably about 0.002 to about 1% by weight of the UF resin. The amount of aqueous ammonia used in the manufacture of the UF resin will generally vary from about 0% to about 20% of 26 Baume ammonia based on the weight of the UF resin and preferably about 3 to about 12%. The UF resins as well as the modified UF resins used in this invention will generally have a pH of from about 7 to about 8.5, a Brookfield viscosity of from about 50 to 500 cps, a free formaldehyde level of about 0 to 3% and preferably about 0.1 to 0.5%, about 45% to about 65% or 70% of non-volatiles, and a water dilutability of about 1:1 to 100:1, preferably 10:1 to 50:1.

The molar ratio of formaldehyde to urea of the UF resins used in this invention can vary over a wide range such as that of from about 1.4 to about 3.0. A preferred molar ratio of formaldehyde to urea in the UF resin is about 1.4 to about 2.4. A typical modified UF resin of this invention has a non-volatile content of about 55%, a pH of about 8 and a viscosity (Brookfield LVF #2/60 rpm, at 25° C.) of about 250 cps.

The phrase "high tear binder" as used in this application refers to a UF resin which has been modified with an amine oxide and further modified with a latex or a water soluble polymer or both a latex and water soluble polymer. All of the modified UF resins contain amine oxide but they may or may not contain the latex and/or water soluble polymer.

The Amine Oxide

The high tear properties imparted to the urea formaldehyde (UF) resin involve the addition to a UF resin of a non-ionic water soluble or dispersable amine-oxide surfactant. The general structure of the amine oxide surfactant can be represented by the following formula:

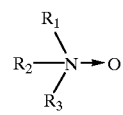

wherein each of $R_1$, $R_2$, and $R_3$ are hydrocarbon groups containing from 1 to about 30 carbon atoms. The hydrocarbon groups can be aliphatic or aromatic, and, if aliphatic, can be linear, branched or cyclic in nature, and can be the same or different in each radical. Aliphatic groups are preferred. The aliphatic hydrocarbon radical can contain ethylenic unsaturation. Preferably the aliphatic groups are selected from among alkyl groups such as lower alkyl or hydroxy-alkyl groups having from 1–4 carbon atoms and substituted alkyl groups thereof, or long chain alkyl groups having from 12 to 30 carbon atoms such as stearyl, lauryl, oleyl, tridecyl, tetradecyl, hexadecyl, dodecyl, octadecyl, nonadecyl or substituted groups thereof. The sum of the various R groups normally have about 14–40 carbon atoms and particularly 18–24 carbon atoms.

The quantity of amine oxide used to make the modified UF resin of this invention is in an amount sufficient to improve the tear property of a glass fiber mat. Thus, the concentration of the amine oxide in the modified UF resin can vary over a broad range such as that from about 0.01% to about 1%, preferably about 0.05% to 0.2% and particularly about 0.1% to about 0.15% based on the weight of the modified UF resin, i.e., the UF resin together with the modifier or modifiers of this invention.

The amine oxide is preferably added at the end of the UF polymerization. However, the amine oxide can be added to the UF resin at any time such as during the polymerization reaction of the urea with the formaldehyde in the manufacture of the UF resin or afterwards. The addition of the amine oxide, such as by mixing and blending in the UF resin under ambient conditions, modifies the resin to produce a modified UF resin. The further addition of the latex and/or water soluble polymer, again such as by mixing and blending, further modifies the resin to produce the high tear binder. The order in which the modifiers are added to the resin is not important although it is preferred that the amine oxide be added first.

Commercial examples of amine oxides which can be used in this invention include those sold by Akzo Nobel such as: Aromox DM 16 which contains dimethylhexadecylamine oxide, Aromox C/12 which contains a mixture of N-coco alkyl-2,2'-iminobis-ethanol-N-oxide, Aromox T/12 which contains bis(2-hydroxyethyl)tallowamine oxide; Aromox DMC which contains dimethylcocoamine oxide; and Aromox DMHT which contains dimethyl(hydrogenated-tallow) amine oxide. Of course amine oxides having the same chemical structures and supplied by other chemical companies are also suitable.

The Latex Modifier

The purpose of adding a suitable latex modifier in this invention is to provide an enhancement to the tensile property of the amine oxide modified UF resin. The latex increases tensile without affecting the high tear property of the amine oxide modified UF resin. An example of a preferred latex is an anionic acrylic latex marketed by Rohm and Haas Company under the trade name Emulsion E2321. This latex is a very firm binding agent used as an additive to stiffen hand in fabric finishing operations. It has good wash/dry-cleaning durability and abrasion resistance. Its glass transition (Tg) temperature is 105° C. It is packaged at pH 7.5 and the Brookfield viscosity is 50 cps at about 45% solids.

The quantity of latex used in this invention is in an amount sufficient to improve the tensile property of a glass fiber mat. Thus, the latex can generally be used at a concentration of about 0.1% to about 25%, preferably about 2% to 20% and particularly about 6% to 15% based on the weight of latex as a percentage of the weight of the UF resin containing the latex together with any of the other modifiers. Preferably, the latex is added and thoroughly mixed with the UF resin at any time after the completion of the urea and formaldehyde polymerization reaction and at a pH of about 7 to about 8.5.

Anionic acrylic and vinyl acrylic latices can be used in this invention. Preferably such latices have Tgs (glass transition temperatures) between about 25° C. to about 110° C. Also, it is preferred that such latices have self-crosslinking capacity. Examples of suitable commercial latices for use in this invention include: the above mentioned Emulsion E2321, Rhoplex OP 62 and Rhoplex Exp 3360 which are supplied by Rohm and Haas Chemical Company; CPD 3102 series, supplied by Sequa Chemicals, Inc; Convinex 380 and Convinex JW 215 supplied by Franklin International, and PD 8168 series of latex which have a Tg at about 100° C., as supplied by Fuller Chemical Company can be used. The acrylic latex can be based on polymers or copolymers produced from monomers comprising ethylenically unsaturated carboxylic acid monomers such as acrylic acid, methacrylic acid and esters of these monomers such as methylacrylate, methylmethacrylate and cross-linkable functional comonomers, for example, but not limited to, methylol-acrylamide. The vinyl acrylic latex is a copolymer of an acrylic monomer, e.g., an acrylate monomer and a vinyl monomer. Illustrative of acrylate monomers there can be mentioned those represented by the following structure:

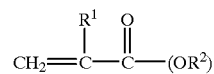

wherein C, H, and O represent carbon, hydrogen and oxygen and $R^1$ and $R^2$ are alkyl groups. Depending on the choice of $R^1$ and $R^2$, polymers or copolymers of the acrylate having different hardness and Tg values can be prepared. The preferred vinyl acrylate polymer is that of an acrylate and vinyl acetate which generally produces a hard polymer.

The Water Soluble Polymer Modifier

The water soluble polymer contains 40–100% by weight, based on polymer weight, of at least one polymerized ethylenically unsaturated carboxylic acid monomer. The water soluble polymer is formed by polymerization of ethylenically unsaturated monomers such as, for example, methacrylic acid, acrylic acid, crotonic acid, fumaric acid, maleic acid, 2-methyl maleic acid, itaconic acid, 2-methyl itaconic acid, a,b-methylene glutaric acid, and salts thereof. Alternatively, ethylenically unsaturated anhydrides which form carboxylic acids during or subsequent to polymerization may be used in the polymerization such as, for example, maleic anhydride, itaconic anhydride, acrylic anhydride, and methacrylic anhydride. Additional ethylenically unsaturated monomer(s) may be copolymerized with the carboxylic acid monomer in an amount of 0–60% by weight, based on polymer weight, such as, for example, acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropylmethacrylate; acrylamide or substituted acrylamides; styrene or substituted styrenes; butadiene; vinyl acetate or other vinyl esters; acrylonitrile or methacrylonitrile; and the like. The optional additional ethylenically unsaturated monomer must be selected so as not to render the polymer insoluble in water; thus, only lesser amounts of hydrophobic monomers may be used while greater amounts of hydrophilic monomers ma be used without compromising water solubility of the polymer. The water soluble polymer has a weight average molecular weight from 100,000 to 2,000,000, as measured by aqueous gel permeation chromatography. The water soluble polymers which are used in this invention as well as their method of preparation are described in greater detail in U.S. Pat. No. 5,804,254 of Sep. 8, 1998 to P. Nedwick et al. which is incorporated herein by reference it its entirety. When the water soluble polymers are used in this invention it is preferred that they be neutralized to a pH of about 7 to about 11 and preferably to a pH of about 8 to 11. Conventional alkaline materials can be used for neutralizing the polymers such as that of ammonia, ammonium carbonate, as well as alkali metal or alkaline earth metal hydroxides and carbonates such as those of sodium, potassium and calcium.

A water soluble polymer can be used in conjunction with or instead of the latex modifier in this invention in preparing the high tear binder. An ammonia neutralized polyacrylate solution polymer marketed by Rohm and Haas Company under the trade name Solution HS 100 is an example of a water soluble polymer which can be used in this invention. It also finds uses for thickening and stabilizing water based synthetic and natural latices. Solution HS 100 is a clear to slightly hazy liquid usually shipped at 11% solids at a pH of 9.3. It has a Brookfield viscosity of about 700 cps. It also finds uses for thickening and stabilizing water based synthetic and natural latices.

The addition of the water soluble polymer as well as the latex is generally made after the manufacture of the UF resin either before, after or at the same time as the addition of the amine oxide to the UF resin. Preferably they are added after the addition of the amine oxide. The water soluble polymer can be used in the amine oxide modified UF resin, with or without the use of the latex.

The quantity of the water soluble polymer used in the binder compositions of this invention is in an amount sufficient to improve the tensile property of a glass fiber mat. The quantity of water soluble polymer used in the modified UF resin can vary over a wide range such as that of about 0.1% to about 5% and preferably about 0.2 to about 3% based on the weight of the modified UF resin. Ammonia neutralized polyacrylate solutions with a range of molecular weight as represented by Brookfield viscosities between 400 to 1000 cps at 11% solids are preferably used as the water soluble polymer in this invention.

When both the acrylic latex and water soluble polymer are used in the high tear binder, the quantities of each can be such as those given hereinabove for each of the latex and water soluble polymer, although it is preferred that the total quantity of the these two modifiers not exceed about 25% based on the weight of latex plus water soluble polymer in relation to the weight of the UF resin modified with the amine oxide, latex and water soluble polymer.

The amount of binder applied to the glass fiber mat in this invention is in an amount sufficient to attain desired tear and/or tensile properties. Thus, this quantity can vary over a wide range such as that of loadings in the range of about 3 to 45 percent by weight, and preferably about 10 to 40 percent by weight of non-volatile binder composition based on the dry weight of the bonded mat.

The modified UF resin of this invention can be applied to a wide variety of glass fiber mats since the chemical and physical properties resulting from prior treatment of the fibers and mats such as sizing, suspending agents and the various other processes and compositions used to make the fiber and mat are substantially less critical to the tear and tensile properties imparted to the glass fiber mat by the high tear binder as compared to other UF binder compositions for improving tear and/or tensile in glass fiber mats. Nevertheless, certain binders of this invention in combination with certain glass fiber mats will provide the more desirable tensile and tear properties. Also, certain formulations of the binder of this invention in combination with certain glass fiber mats will provide the more desirable tensile and tear properties. In this respect however, those mats from fibers which provide very high tear strength accompanied by a substantial loss of tensile strength are not recommended for use in this invention.

The applicability of the high tear binder to glass fiber mats having different chemical and physical properties is unusual since conventional UF binders used on mats are limited as to their ability to improve the tensile and tear of mats having differences in chemical and physical properties. Since applicants' high tear binder is suitable for improving the tear and tensile properties of glass fiber mats having a broad range of chemical and physical properties, and further since some combinations of binder and mat show optimal or improved properties, the binders of this invention can be used in testing various mats in order to choose mats having desirable properties. The production of additional mats bonded with the binder can then proceed by using glass fiber mats having substantially the same physical and chemical properties as those having the chosen desirable tear and tensile properties. Desirable properties can include different criteria such as tear strength, tensile strength, or combinations of tear and tensile strength. Choosing a particular formulation of a binder of this invention for use with glass fiber mats exhibiting similar tear and tensile properties in order to obtain desirable tear and/or tensile properties can also be done by such testing and choosing since the binder of this invention can use a broad concentration of modifying agents and include or eliminate the latex or water soluble polymer to provide the more desirable tear and tensile properties. The production of glass fiber mats of substantially the same chemical and physical properties can then proceed with the use of the chosen formulation.

In order that those skilled in the art may more fully understand the invention presented herein, the following examples are set forth. All parts and percentages in the examples, as well as elsewhere in this application, are by weight unless the context clearly indicates otherwise. Standard methods for determining physical and chemical properties as used by applicants' employer were used to obtain the results shown in the following examples.

EXAMPLE 1

Improvement in Tear Strength by the use of Amine Oxide

A commercial urea formaldehyde (UF) resin manufactured by Borden Chemical, Inc. under the trade name FG 458 was used in this example. This resin had a viscosity of 382 cps at 65% solids and a pH of 7.9. This resin is referred to in Table 1 below as Resin 1A.

An appropriate amount of dimethylhexadecylamine oxide was added to Borden's commercial resin FG 458 such that there were 5,000 ppm (parts per million) of amine oxide on a dry weight basis in the FG 458 resin. This resin solution is referred to in Table 1 below as Resin 1B.

A pre-formed glass fiber mat was used for this test. This mat was made in a pilot plant machine using a 1–3% concentration of hydroxyethyl cellulose in water to provide the minimum strength to hold the mat together. There was no drippage of water from the mat. The modified UF resin solutions were sprayed on to the mat evenly and vacuum dried. Then, the treated mats were cured in an oven at the selected temperatures for 3 minutes. The glass mats were then cut into strips and tested using an Instron testing machine. The results of the tests are shown in Table 1 below.

TABLE 1

| Resin | Cure for 3 minutes at | LOI* % | Wet Tensile lb/38 mm | Dry Tensile lbs/38 mm | % Wet/ Dry | Tear (g) |
| --- | --- | --- | --- | --- | --- | --- |
| 1A | 330° F. | 21.04 | 18.63 | 50.3 | 37.1 | 377 |
| 1A | 375° F. | 22.51 | 37.95 | 50.3 | 75.5 | 349 |
| 1A | 420° F. | 22.08 | 39.20 | 50.6 | 77.5 | 385 |

TABLE 1-continued

| Resin | Cure for 3 minutes at | LOI* % | Wet Tensile lb/38 mm | Dry Tensile lbs/38 mm | % Wet/ Dry | Tear (g) |
|---|---|---|---|---|---|---|
| 1B | 330° F. | 22.17 | 15.47 | 50.9 | 30.4 | 457 |
| 1B | 375° F. | 19.96 | 33.98 | 50.4 | 67.4 | 470 |
| 1B | 420° F. | 20.36 | 32.73 | 43.5 | 75.3 | 459 |

LOI represents the percent of UF resin or modified UF resin on the glass fiber mat. In this test, a treated mat with a known weight is placed in an oven at a sufficiently high temperature to burn off the binder. After the ignition, the weight of the sample is measured again. Only glass fiber remains after ignition. The % of the difference between these weights (the loss due to ignition) provides the % of resin or binder in the treated mat.

It can be seen from Table 1 above that the addition of amine oxide improved the tear property of the urea formaldehyde (UF) resin while maintaining the tensile strength properties.

EXAMPLE 2

Urea Formaldehyde Resin Modified by Various Amine Oxides

A commercial UF resin sold by Borden Chemical, Inc. under the trade name FG 458 was used in this example. Amine oxides with different chemical structures were added to the UF resin to make up different modified UF resin solutions which were applied to glass fiber mats, cured and tested for the properties shown in Table 2 below. In Table 2, the various compositions tested were the following:

Resin 1 was the resin (FG 458) without the addition of amine oxide.

Resins 2–5 were that of the resin (FG 458) modified by the following indicated amine oxides:

Resin 2 contained N-coco alkyl 2,2'-imiobis-ethanol-N-oxide which was added to FG 458 such as that the resulting 60% solids solution had 912 ppm of the amine oxide.

Resin 3 contained coco alkylethylamine oxide which was added to FG 458 such that the resulting 60% solids solution had 912 ppm of the amine oxide.

Resin 4 contained coco alkyldimethylamine oxide. This oxide was added to FG 458 such that the resulting 60% solids solution had 912 ppm of amine oxide.

Resin 5 contained N,N-dimethyl-1,1-hexadecylamine oxide (dimethylhexadecylamine oxide). This product was added to resin FG 458 so that the resulting 60% solids solution contained 450 ppm of amine oxide.

The tests in this example were performed by using handsheet making equipment with uniform preparation of: handsheets, application of binders (the FG 458 resin as well as the modified FG 458 resins) in a manner similar to Example 1 above, curing conditions and testing. The results of this example are shown in Table 2 below. Column A in the table indicates the UF resin or modified UF resin which were used as the binder. The column in Table 2 entitled "%WT/ DT" is the percentage of the wet tensile strength as compared to the dry tensile strength.

TABLE 2

| A | Basis Wt (lbs/ 100 ft²) | Cure ° F. 3 min. at | Wet Tensile lbs/38 mm | Dry Tensile lbs/38 mm | % WT/ DT | Tear (g) |
|---|---|---|---|---|---|---|
| 1 | 17.5 | 350 | 41.2 | 57.9 | 71.2 | 279 |
| 1 | 17.3 | 375 | 40.6 | 53.9 | 75.4 | 310 |
| 1 | 17.6 | 400 | 42.8 | 50.3 | 85.1 | 347 |
| 1 | 17.3 | 425 | 42.8 | 47.5 | 90.1 | 392 |
| 2 | 17.4 | 350 | 26.6 | 41.8 | 52.8 | 422 |
| 2 | 17.4 | 375 | 32.5 | 41.9 | 77.6 | 434 |
| 2 | 17.1 | 400 | 33 | 40.1 | 82.3 | 452 |
| 2 | 17.2 | 425 | 31.4 | 36.7 | 77.5 | 496 |
| 3 | 17.4 | 350 | 20.8 | 39.3 | 52.8 | 506 |
| 3 | 17.4 | 375 | 29.8 | 41.0 | 72.6 | 505 |
| 3 | 17.3 | 400 | 32.0 | 38.5 | 83.2 | 497 |
| 3 | 17.4 | 425 | 25.1 | 32.3 | 77.5 | 496 |
| 4 | 17.6 | 350 | 33.3 | 48.8 | 68.2 | 430 |
| 4 | 17.2 | 375 | 35.7 | 47.6 | 75.1 | 424 |
| 4 | 17.3 | 400 | 33.7 | 40.5 | 83.3 | 443 |
| 4 | 17.3 | 425 | 33.1 | 43.1 | 77.0 | 458 |
| 5 | 16.6 | 350 | 7.3 | 34.7 | 21.0 | 555 |
| 5 | 17.3 | 375 | 15.0 | 37.6 | 39.8 | 524 |
| 5 | 17.4 | 400 | 21.7 | 33.5 | 64.9 | 513 |
| 5 | 17.4 | 425 | 19.9 | 33.5 | 59.0 | 480 |

It can be seen from Table 2 above that UF resin modified by amine oxides of different chemical structures provided a substantial amount of increase in the tear property of the handsheets.

EXAMPLE 3

Binder of UF Resin Modified with Latex Compared with Binder of UF Resin Containing Both Amine Oxide and Latex This example demonstrates the advantage of this invention wherein the UF resin has been modified with both an amine oxide and a vinyl acrylate latex (Binder 3B) as compared to a UF resin which was modified with a commercial binder but which was not further modified by addition of the amine oxide (Binder 3A) in Table 3 below. The UF resin used in this example was Resin FG 413 which is produced by Borden Chemical, Inc. The amine oxide used in Binder 3B was dimethylhexadecylamine oxide. The vinyl acrylate latex in Binder 3B had a glass transition temperature of about 100° C. The handsheets and application of binder were performed in a manner similar to that of Example 1 above. The latex to UF resin ratio in Binder 3B was 10 parts of latex to ninety parts of UF resin on a dry weight basis. Conditions of the tests and results of this example wherein the two different binders were tested are shown in Table 3 below.

TABLE 3

| Binder | Cure ° F. 3 min | Weight (lbs/ 100 ft²) | LOI* % | Wet Tensile lbs | Dry Tensile lbs | Wet/ Dry % | Tear (g) |
|---|---|---|---|---|---|---|---|
| 3A | 350 | 1.74 | 21.1 | 39.23 | 61.5 | 64 | 327 |
| 3A | 375 | 1.75 | 21.5 | 45.5 | 60.0 | 75.8 | 307 |
| 3A | 400 | 1.75 | 21.2 | 45.2 | 60.52 | 74.6 | 305 |
| 3B | 350 | 1.75 | 21.2 | 39.6 | 58.9 | 67.3 | 374 |
| 3B | 375 | 1.75 | 21.4 | 44.9 | 60.3 | 74.4 | 403 |
| 3B | 400 | 1.75 | 21.5 | 42.1 | 54.0 | 78.0 | 439 |

*LOI is as defined for Table 1 above.

It can be seen from the above Table 3 above that the binder of this invention which had the UF resin modified by both the amine oxide and the vinyl acrylate latex significantly increased the tear resistance while maintaining an acceptable tensile strength.

EXAMPLE 4

UF Resin Binder Composition Using Both an Amine Oxide and a Water Soluble Polymer This example compares (a) a binder of this invention wherein the urea formaldehyde resin is modified by both an amine oxide and an ammonia neutralized water soluble polymer of this invention, designated as Binder 4B in Table 4 below, with (b) a binder having the urea formaldehyde resin modified by the same ammonia neutralized water soluble polymer as was used in Binder 4B but without amine oxide, designated as Binder 4A below in Table 4. The UF resin in Binder 4A and Binder 4B was that of Resin FG 413 which is supplied by Borden Chemical, Inc. The column in Table 4 entitled "Wt/Dt %" is simply the wet tensile reading divided by the dry tensile reading.

TABLE 4

| Binder | Cure °F. 3 min | Weight lbs/ 100 ft$^2$ | LOI* % | Wet Tensile lbs | Dry Tensile lbs | Wt/ Dt % | Tear (g) |
|---|---|---|---|---|---|---|---|
| 4A | 350 | 1.75 | 21.4 | 40.1 | 60.6 | 66.2 | 326 |
| 4A | 375 | 1.78 | 22.5 | 47.2 | 61.5 | 76.8 | 365 |
| 4A | 400 | 1.78 | 22.9 | 46.4 | 60.3 | 77.0 | 366 |
| 4B | 350 | 1.76 | 21.8 | 48.5 | 72.2 | 67.1 | 439 |
| 4B | 375 | 1.77 | 22.1 | 52.9 | 70.8 | 74.7 | 477 |
| 4B | 400 | 1.76 | 22.0 | 54.6 | 64.9 | 84.1 | 500 |

*LOI is as defined in Table 1 above.

It can be seen from the above Table 4 that the binder of this invention, wherein the UF resin was modified with both an amine oxide and the water soluble polymer (Binder B), provided a substantial increase in the tear property of the mat without any loss of tensile properties in comparison with a binder wherein the UF resin was modified with the acrylic latex but without the amine oxide (Binder A).

EXAMPLE 5

Use of Different Glass Fibers

This example demonstrates the application technology provided by this invention that makes use of the binders of this invention together with the choice of different glass fibers to achieve the goal of improved tear property of glass mats, without loss of tensile property. A commercial UF binder supplied by Borden Chemical, Inc. was used in this example as a control and as the UF resin for the preparation of various modifications in accordance with this invention. Glass fibers from manufacturer A and glass fibers from manufacturer B were used in this example. The glass fibers used in this example from each if the manufacturers are conventionally used for making UF resin bound glass fiber mats and the grade of fiber from each manufacturer was much the same. Each of the glass fibers had a length of about one inch and substantially the same diameter. The glass fibers from supplier "A" are referred to as Fiber A. The glass fibers from supplier B are referred to as Fiber B. It was noted that Fiber A interacts with the binder and modified binders in a way different from Fiber B. This is probably due to the difference in sizing compositions and technology used by the manufacturers of the two different fibers. The goal of this test is to provide a high tear application process (choosing the more desirable glass fiber mats or formulations) and binder composition to produce an optimum tear property with acceptable tensile. Binder HT(2) is a binder of this invention wherein the urea formaldehyde resin is modified with about 0.1% of an amine oxide and about 10% of an acrylic latex based on the weight of the modified UF resin. The binder HT(3) is the binder HT(2) plus the addition of a water soluble ammonia neutralized acrylate polymer solution providing the range of concentration set forth herein for such polymer.

The results of this example are shown in Table 5 wherein binders are applied to glass fiber mats. The mats were made using handsheet preparation equipment following standard laboratory procedure for handsheet preparation, binder application, and test methods. The pH of the UF binders in each instance was about 7.8 to about 8.0.

Resin 5A used the Borden resin without addition of amine oxide, latex or water soluble polymer with Fiber A.
Resin 5B used the binder HT(2) with Fiber A.
Resin 5C used the binder HT(3) with Fiber B .
Resin 5D used the binder HT(2) with Fiber B .

In the column headings of Table 5 below: the heading "Wet Tens" refers to the wet tensile strength of the glass mat; and "Dry Tens" refers to the dry tensile strength of the mat. The column entitled "% Wet/Dry" is the ratio of wet tensile (Wet Tens) to dry tensile (Dry Tens)

TABLE 5

| Binder | Cure 3 min. at (° F.) | Caliper inches | Basis Weight (lbs/100 ft$^2$) | Calc. LOI* (%) | Wet Tens | Dry Tens | % Wet/ Dry | Tear (g) |
|---|---|---|---|---|---|---|---|---|
| 5A | 350 | 0.0382 | 1.76 | 22.07 | 48.9 | 71.1 | 68.7 | 474 |
| 5A | 375 | 0.0385 | 1.76 | 22.04 | 56.2 | 76.1 | 73.8 | 436 |
| 5A | 400 | 0.0393 | 1.76 | 22.00 | 51.9 | 70.3 | 73.8 | 479 |
| 5B | 350 | 0.0408 | 1.76 | 22.07 | 50.6 | 73.1 | 69.2 | 512 |
| 5B | 375 | 0.0418 | 1.76 | 21.71 | 54.9 | 70.3 | 78.1 | 465 |
| 5B | 400 | 0.0424 | 1.77 | 22.17 | 66.0 | 70.5 | 93.5 | 516 |
| 5C | 350 | 0.0372 | 1.76 | 21.97 | 44.5 | 70.5 | 63.2 | 564 |
| 5C | 375 | 0.0368 | 1.75 | 21.55 | 51.7 | 71.9 | 71.9 | 579 |
| 5C | 400 | 0.0355 | 1.74 | 20.89 | 54.2 | 71.0 | 76.4 | 589 |
| 5D | 350 | 0.0381 | 1.75 | 21.28 | 44.2 | 68.7 | 64.3 | 611 |
| 5D | 375 | 0.0362 | 1.77 | 22.20 | 52.4 | 70.6 | 74.2 | 584 |
| 5D | 400 | 0.0366 | 1.75 | 21.32 | 52.6 | 65.5 | 80.3 | 667 |

*LOI is as defined above for Table 1.

It can be seen from Table 5 above that the HT(2) binder, i.e., the binder of this invention wherein UF resin was modified with amine oxide and the acrylic latex, can provide satisfactory results in any of the tests. However, the use HT(2) and HT(3) binders with Fiber B provide the optimum balance of dry tensile and tear properties. HT(3) appears to provide the desired properties under a broader curing temperature range.

EXAMPLE 6

Increase of Tear Property in Roofing Shingle

Tests were made with the HT(2) binder as shown in Example 5 above. The results showed that by using this binder, the tear strength of the shingle (that is, the glass fiber mat which was converted to asphalt coated roofing shingle), attained an average tear strength which was about 17% greater, without producing any unacceptable loss of tensile property, in comparison to conventional UF binders used in making glass mats. Thus, the binders of this invention provided the superior tear strength while maintaining an acceptable tensile and without using more glass fiber. Fiber A of Example 5 was used for these tests.

Example 6 demonstrates that the binder composition and process for choosing optimal glass fiber mats and optimal formulations of the binders of this invention not only successfully attain the desired tear strength of the glass fiber mat but also provided the high tear strength to the roofing shingles made from the glass fiber mat.

What is claimed is:

1. A binder composition comprising a urea formaldehyde resin modified with a water soluble non-ionic amine oxide and a member selected from the group consisting of an anionic acrylic latex, a water soluble polymer comprising 40–100% by weight, based on polymer weight, of a polymerized ethylenically unsaturated carboxylic acid monomer, the polymer having a weight average molecular weight of from 100,000 to 2,000,000 and a mixture of said latex and water soluble polymer wherein the quantity of amine oxide is from about 0.01% to about 1%, the quantity of latex is from about 1% to 25%, the quantity of water soluble polymer is from about 0.01% to about 5% provided that the mixture of latex and water soluble polymer is not greater than about 25%, said percentages based on the weight of urea formaldehyde resin and amine oxide together with latex and/or water soluble polymer.

2. The binder of claim 1 wherein the resin is modified with the amine oxide and the latex wherein the latex is a self-crosslinking anionic vinyl acrylic latex having a glass transition temperature between about 25° C. to about 110° C., the quantity of amine oxide is from about 0.05% to about 0.2% and the quantity of latex is from about 2% to about 20%.

3. The binder of claim 1 wherein the resin is modified with the amine oxide and the water soluble polymer and the quantity of amine oxide is from about 0.01% to about 0.2% and the quantity of water soluble polymer is from about 0.2% to about 3%.

4. The binder of claim 1 wherein the urea formaldehyde resin modified with the amine oxide is further modified with both a vinyl acrylic latex and the water soluble polymer wherein the water soluble polymer is an ammonia neutralized polyacrylate having a pH of about 7–11.

5. A glass fiber mat bonded with a binder composition comprising a cured urea formaldehyde resin modified with a water soluble non-ionic amine oxide wherein the amount of amine oxide is in an amount sufficient to impart improved tear properties to the mat and optionally an anionic acrylic latex, a water soluble polymer comprising 40–100% by weight, based on polymer weight, of a polymerized ethylenically unsaturated carboxylic acid monomer, the polymer having a weight average molecular weight from 100,000 to 2,000,000, or a mixture of said latex and water soluble polymer wherein the quantity of said latex, water soluble polymer and mixtures thereof is sufficient to improve the tensile property of the mat.

6. The mat of claim 5 wherein the resin is modified with a water soluble non-ionic amine oxide.

7. The mat of claim 5 wherein the resin is modified with a water soluble non-ionic amine oxide and a self-crosslinking anionic acrylic latex having a glass transition temperature of between about 25° C. to 110° C.

8. The mat of claim 5 wherein the resin is modified with a non-ionic amine oxide and a water soluble polymer.

9. The mat of claim 5 wherein the resin is modified with the amine oxide, and both a latex and a water soluble polymer.

10. A glass fiber mat treated with a binder composition comprising a urea formaldehyde resin modified with a water soluble non-ionic amine oxide and optionally an anionic acrylic latex, a water soluble polymer comprising 40–100% by weight, based on polymer weight, of a polymerized ethylenically unsaturated carboxylic acid monomer, the polymer having a weight average molecular weight from 100,000 to 2,000,000, or a mixture of said latex and water soluble polymer wherein the quantity of amine oxide is sufficient to improve the tear properties of the mat treated with urea formaldehyde resin and the quantity of acrylic latex, water soluble polymer or mixture of said latex and water soluble polymer is sufficient to increase the tensile strength of the mat treated with urea formaldehyde and amine oxide.

11. The mat of claim 10 wherein the urea formaldehyde resin is modified with an amine oxide and a vinyl acrylic latex.

12. A roofing product comprising an asphalt impregnated glass fiber mat wherein the mat has been bonded with a urea formaldehyde resin modified with a water soluble non-ionic amine oxide and, optionally, an anionic acrylic latex and/or a water soluble polymer comprising 40–100% by weight, based on polymer weight, of a polymerized ethylenically unsaturated carboxylic acid monomer, the polymer having a weight average molecular weight from 100,000 to 2,000,000.

13. The roofing product of claim 12 wherein the urea formaldehyde resin is modified with an amine oxide.

14. The roofing product of claim 12 wherein the urea formaldehyde resin is modified with a water soluble non-ionic amine oxide and an acrylic latex.

15. The roofing product of claim 12 wherein the urea formaldehyde resin is modified with an amine oxide and a water soluble polymer.

16. The roofing product of claim 12 wherein the urea formaldehyde resin is modified with an amine oxide, an acrylic latex and a water soluble polyacrylate polymer.

17. A process for making a modified binder composition which comprises mixing about 0.01% to about 1% of a water soluble non-ionic amine oxide and a further modifier, said further modifier being a member selected from the group consisting of about 2% to about 20% of an anionic acrylic latex, about 0.2% to about 3% of a water soluble polymer comprising 40–100% by weight, based on polymer weight, of a polymerized ethylenically unsaturated carboxylic acid monomer, the polymer having a weight average molecular weight from 100,000 to 2,000,000 and both latex and water soluble polymer in a urea formaldehyde resin, provided that the total quantity of latex and water soluble polymer do not exceed about 20%, and wherein all percentages are based on the total weight of urea formaldehyde resin together with the amine oxide and any further modifier.

18. The process of claim 17 wherein the further modifier is an acrylic latex.

19. The process of claim 17 wherein the further modifier is a water soluble polyacrylate polymer.

20. The process of claim 17 wherein the further modifier is both a latex and a water soluble polymer.

21. A process for obtaining improved tear and/or tensile properties in glass fiber mats bonded with a urea formaldehyde binder composition comprising a urea formaldehyde resin modified with a water soluble non-ionic amine oxide and a member selected from the group consisting of an anionic acrylic latex, a water soluble polymer comprising 40–100% by weight, based on polymer weight, of a polymerized ethylenically unsaturated carboxylic acid monomer, the polymer having a weight average molecular weight from 100,000 to 2,000,000 and both a latex and said water soluble polymer, said process comprising the steps of:

(A) testing various glass fiber mats in order to determine their tear and tensile strength with the use of the said binder; and
(B) choosing glass fiber mats which were found to have a desirable tear and/or tensile strength for binding into mats with said binder; and optionally
(C) using glass fiber mats having substantially the same chemical and physical properties as the mats which were found to have a desirable tear an/or tensile strength for production of additional mats bonded with said binder.

22. A process for obtaining improved tear and/or tensile properties in glass fiber mats bonded with a urea formaldehyde binder wherein various formulations of said binder provide different values of tensile and/or tear strength to said glass fiber mat bonded with said binder, said binder formulations being that of a urea formaldehyde resin modified with a water soluble non-ionic amine oxide and a member selected from the group consisting of an anionic acrylic latex, a water soluble polymer comprising 40–100% by weight, based on polymer weight, of a polymerized ethylenically unsaturated carboxylic acid monomer, the polymer having a weight average molecular weight from 100,000 to 2,000,000 and both a latex and a water soluble polymer wherein the quantity of the amine oxide, latex and said polymer, as well as the presence or absence of either the latex or water soluble polymer in the formulation differ, said process comprising the steps of:
(A) testing various formulations of said binder differing in the quantity of amine oxide, the quantity of said members as well as the entire presence or absence of one of said members, said testing being on mats which provide substantially the same tear and tensile properties when the same formulation is used in order to determine the tear and tensile strength of the glass fiber mats after application of different formulations; and
(B) choosing the formulation which provides the improved tear and/or tensile strength of the glass fiber mats; and optionally
(C) using the formulation which was chosen in (B) above for the further production of glass fiber mats bonded with the chosen formulation.

23. A process for making a glass fiber mat which comprises:
(A) forming an aqueous suspension of glass fibers;
(B) passing the suspension through a mat forming screen to form a wet non-woven mat;
(C) applying a urea formaldehyde resin binder to the wet non-woven mat, said binder comprising about 0.01% to about 1% of a water soluble non-ionic amine oxide and optionally a further modifier, said further modifier being a member selected from the group consisting of about 2% to about 20% of an anionic acrylic latex, about 0.2% to about 3% of a water soluble polymer comprising 40–100% by weight, based on polymer weight, of a polymerized ethylenically unsaturated carboxylic acid monomer, the polymer having a weight average molecular weight from 100,000 to 2,000,000 and both latex and water soluble polymer, and wherein all percentages are based on the total weight of urea formaldehyde resin together with the amine oxide and any further modifier.

24. The process of claim 23 which further comprises curing the urea formaldehyde resin in the mat and then coating the mat with hot asphalt to form a roofing product.

25. A binder composition comprising: a blend of a urea formaldehyde resin and a water soluble non-ionic amine oxide; as well as a member selected from the group consisting of an anionic acrylic latex, a water soluble polymer comprising 40–100% by weight, based on polymer weight, of a polymerized ethylenically unsaturated carboxylic acid monomer, the polymer having a weight average molecular weight of from 100,000 to 2,000,00 and a mixture of said latex and water soluble polymer wherein the quantity of amine oxide is from about 0.01% to about 1%, the quantity of latex is from about 1% to 25%, the quantity of water soluble polymer is from about 0.01% to about 5% provided that the quantity of latex and water soluble polymer is not greater than 25%, said percentages based on the weight of urea formaldehyde resin and amine oxide together with latex and/or water soluble polymer, said amine oxide being of the formula:

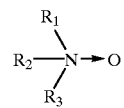

wherein each of $R_1$, $R_2$, and $R_3$, are hydrocarbon groups containing from about 1 to 30 carbon atoms and the sum of the various R groups contain 14 to 40 carbon atoms.

26. A glass fiber mat impregnated with a binder composition comprising a mixture of a curable urea formaldehyde resin and from about 0.05% to about 0.2%, based on the weight of the mixture, of an amine oxide of the formula:

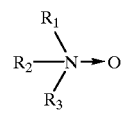

wherein each of $R_1$, $R_2$, and $R_3$, are alkyl groups and the sum of the R groups contain about 14 to 40 carbon atoms.

* * * * *